United States Patent [19]

Kopp

[11] Patent Number: 4,656,932

[45] Date of Patent: Apr. 14, 1987

[54] COFFEE FILTER RING

[76] Inventor: Earl Kopp, 708 Stark Dr., Las Vegas, Nev. 89107

[21] Appl. No.: 752,954

[22] Filed: Jul. 8, 1985

[51] Int. Cl.$^4$ .................... A47J 31/08; A47J 31/02
[52] U.S. Cl. ............................ 99/295; 24/16 PB; 99/306; 210/474
[58] Field of Search ............... 99/295, 306, 279; 24/16 PB, 17, 455; 210/478, 474, 481, 495, 471; 248/315; 426/433; 220/403, 404

[56] References Cited

U.S. PATENT DOCUMENTS

| | | | |
|---|---|---|---|
| 680,680 | 8/1901 | Armstrong | 248/315 |
| 1,319,017 | 10/1919 | Lyttle | 210/478 |
| 1,645,818 | 10/1927 | Overboe | 210/495 |
| 1,652,970 | 12/1927 | Workman | 210/495 |
| 3,388,804 | 6/1968 | Hester | 210/474 |
| 4,097,966 | 7/1978 | Lefnaer | 24/16 PB |
| 4,303,525 | 12/1981 | Stover | 210/474 |
| 4,468,840 | 9/1984 | Sauer | 24/16 PB |

Primary Examiner—Robert W. Jenkins
Attorney, Agent, or Firm—Seiler, Quirk & Tratos

[57] ABSTRACT

A device for securing a coffee filter in a coffee maker basket comprises a contractable annular member expandable for urging the coffee filter against the inner side of the basket to prevent coffee grounds from slipping between the filter and the side of the basket and into the coffee.

10 Claims, 5 Drawing Figures

COFFEE FILTER RING

BACKGROUND OF THE INVENTION

Coffee makers using bowl-shaped paper filters in a filter basket in which coffee is brewed by passing boiling water through ground coffee beans placed in the filter have recently become very popular. Such devices are considered to be very efficient and easy to use, especially since the coffee grounds are easily disposed by simply lifting the filter containing the used coffee grounds from the filter basket. Thus, the used coffee grounds are easily discarded without being separately cleaned from a metal brewing basket used in the well known percolator-type coffee maker.

As convenient as drip coffee makers are to use, a disadvantage is that once the filter paper is wetted, the vertical side of the bowl-shaped filter become limp and does not retain its shape againt the vertical side of the filter basket. When this occurs, as the hot water pours into the filter basket, coffee grounds floating on top of the water level surface may spill over the limp and sagging upper edge of the filter and pass between the filter and the filter basket and into the coffee. The device of the present invention is intended to reduce or eliminate such a problem.

SUMMARY OF THE INVENTION

The present invention provides a device intended to reduce or eliminate the unintended travel of coffee grounds from within the filter, between the filter and the filter basket, and into the coffee. The device comprises an expandable ring which is placed inside the filter below the upper edge thereof and which presses against the inner filter surface urging it against the side of the filter basket. Such a device prevents the wet filter side from sagging or otherwise being displaced and prevents coffee grounds from passing around the filter.

DETAILED DESCRIPTION OF THE INVENTION

Figure 1:
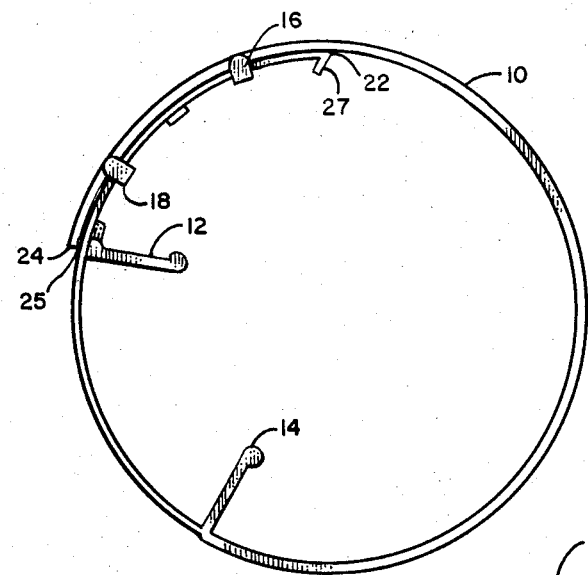
FIG. 1 is a top view of the ring device of the invention.

FIG. 1 illustrates the annular member or ring 10 of the invention having a pair of opposite and free ends 22 and 24 whereby the ring can be expanded or contracted. Also referring to FIGS. 6 and 7, since the purpose of the ring, as previously described, is to be placed inside a bowl-shaped filter within a filter basket of a drip coffee maker, the ring material must be rigid, but at the same time flexible enough so that the opposite ends may be moved relative to one another for expansion and contraction. Preferably, the ring will have a rest expanded condition giving it a diameter at least slightly greater than the inner diameter of the filter side against which it will be urged when placed in the filter basket. However, the maximum expanded ring diameter is not to be necessarily so limited, so long as it can be contracted sufficiently to be relatively easy to place within the filter and filter basket. Preferably, the rest expanded condition of the ring is of substantially greater diameter than the filter basket, so that when compressed, the ring will be sufficiently urged against the filter to be effective.

Figure 2:
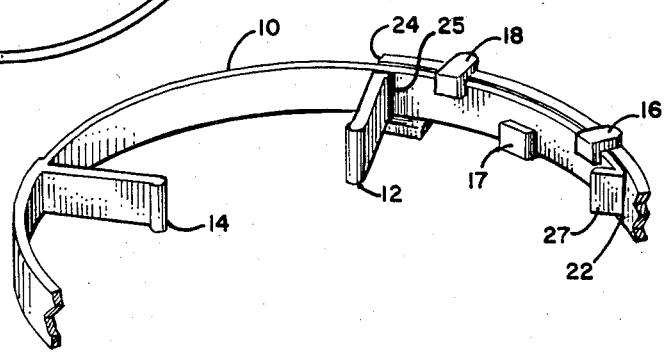
FIG. 2 is a fragmented perspective view illustrating the relationship of the end of the ring and ring contracting means.

FIGS. 1 and 2 also illustrate examples of means for easily contracting the device comprising a pair of tabs 12 and 14, tab 12 being secured to the ring adjacent ring end 24 and having a slot or channel 25 through which the other end or portion of the ring may pass. Such a relationship is illustrated in FIGS. 1 and 2. Another tab 14 is secured to the ring so that it is near tab 12 but spaced therefrom so that when a user grasps the tabs and urges the tabs together, the ring will be compressed. Preferably, such a compressible ring will be one having memory retention so that when the tabs are released the ring will expand to its normal expanded condition. Also illustrated are guide members 16, 17, and 18 for holding or retaining a portion of ring portion adjacent free ring end 22 in planar relationship with the ring portion adjacent end 24. Without such guide or channeling means, the two free ends of the ring could be displaced in different planes which may affect the resulting operaton of the device. A stop member 27 at the ring end 22 will prevent the end from slipping past guide member 16 thereby further assisting in maintaining the ring ends substantially in a single plane. The guides shown are for the purpose of illustration only, and any number of such guides as well as other guiding means or channels having the same function may be used.

Figure 3:
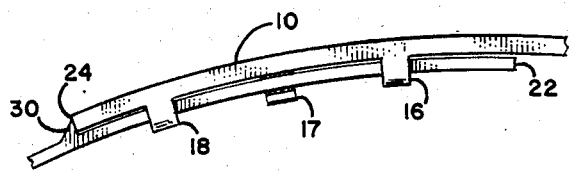
FIG. 3 is a top view of another ring variation illustrating a ring expansion retaining means.
Figure 4:
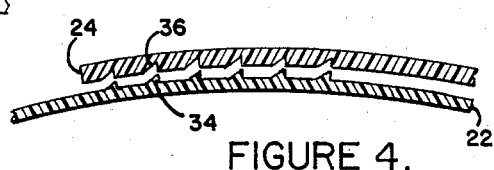
FIG. 4 illustrates ends of yet another ring embodiment for expanded ring retention.

Although the ring may have an expanded memory condition sufficient to urge it rather tightly against the filter paper, it is also desirable to ensure that the expanded condition is retained, even in the presence of hot water to which the ring will be exposed during use. For example, where the ring material is made of a thermoplastic, with sufficient strength to retain it rather snugly against the filter under ambient conditions, in the presence of hot water, it may become somewhat softer whereby the material will be relaxed. In FIGS. 3 and 4, there are illustrated examples of means for retaining the ring in an expanded condition whereby it may be snugly urged against the filter and maintained in that condition without regard to any changes in the flexibility or softening of the ring material. Again, such expansion retainers are especially useful where the ring material is made of a thermoplastic, for example polycarbonate resins, polysulfones, polyphenyl oxides, polyethylene, polyvinyl chloride, polyvinyl acetate, polystyrene, acrylics, or similar plastics. Other useful plastics include polystyrene, high impact polystyrene containing butadiene copolymer, and heat resistant polystyrene which includes alpha-methylstyrene copolymer. Such materials are only examples and are not to be limiting of plastics that may be used. However, the specific resin selected must be able to withstand hot or boiling water without being distorted, warping, crystallized, or otherwise deteriorating at such temperatures. Of course, the ring may also be made of metal. In FIG. 3, a tooth 30 or similar projection may be provided along a surface adjacent ring end 22 for contacting ring end 24 to hold or maintain the ring in a desired expanded condition. Other such expansion retaining means are illustrated in FIG. 4, for example, a pluralty of notches or cavities 36 adjacent ring end 24 in which one or more teeth or ratchets 34 adjacent ring end 22 may be received. Such expansion retaining means are shown by way of example only, and a variety of other such means may be used, including clamps, protrusions and cooperating cavities of any desirable shape which may be snap-fitted or otherwise held together to hold the ring in a desirably expanded condition so that it is snugly or firmly urged against the inside vertical surface of the filter.

Figure 5:
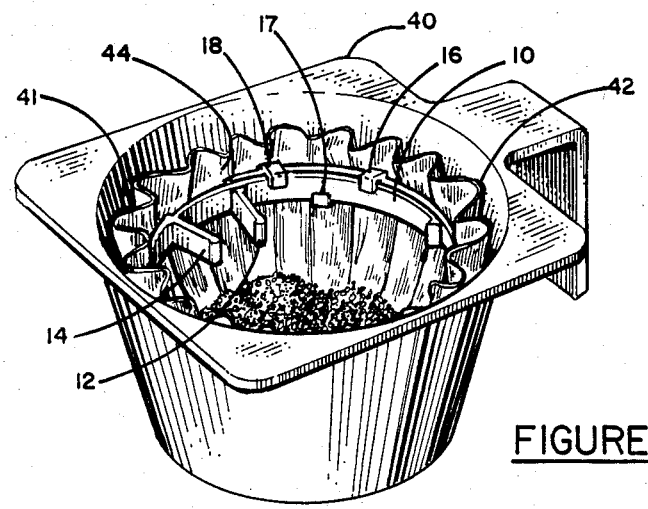
FIG. 5 is a perspective view of the inside of a filter basket illustrating the relationship of the filter and ring in place therein.

FIG. 5 shows the ring device of the invention in position for use within the filter and filter basket of a drip coffee maker. A bowl-shaped coffee filter 44 is placed in filter basket 40 so that the side 42 of the filter is against the vertical filter basket surface 42. Ring 10 may be placed inside the filter, preferably so that it is just below the upper filter edge. As previously explained, regarding FIGS. 1 and 2, where the ring is provided with tabs 12 and 14, or similar means for easily contracting the ring by hand, the user will simply compress the tabs toward one another thereby contracting the ring so that it can more easily be placed within the filter. Once the ring is at a desirable location, where the ring material is such that it will expand naturally once the tabs are released against the filter paper, the device is ready for use. Otherwise, where expanded retention means as previously described are incorporated, they may be secured or locked in place so that the ring is held snugly against the filter paper. The user may simply then insert the coffee grounds in the filter and the coffee made. When it is desired to remove the filter paper with the coffee grounds, the ring device is simply contracted and lifted or removed from the filter and the filter and coffee grounds discarded. It will be evident by using such a device, the filter paper is held against the inside vertical surface of the filter basket whereby the filter paper, even when wetted and otherwise becomes limp, will not separate from the filter basket side which would otherwise allow coffee grounds to float between the sides of the filter and filter basket and into the coffee. Such advantages as well as other embodiments within the purview of the invention will be evident to those skilled in the art.

I claim:

1. In a drip coffee maker including a filter basket and a filter therein, the improvement comprising a contractable annular member inside said filter and urging said filter against said basket said annular member comprising a single length of a contractable memory-retaining material in its normal expanded condition having a diameter greater than the inside diameter of said filter and includes first and second opposite ends and means for securing said ends in a substantially planar relationship and having means secured thereto for being urged together to contract said annular member.

2. The device of claim 1 wherein said means for securing said ends comprises one or more guide members secured along said ring.

3. The device of claim 2 wherein said guide members comprise a first guide member secured along a first edge of said annular member and a second guide member secured along a second opposite edge of said annular member.

4. The device of claim 2 wherein one of said guide members is secured adjacent one of said ends of said annular member.

5. The device of claim 1 wherein said material comprises a synthetic resin which is substantially unaffected by boiling water.

6. The device of claim 1 wherein said annular member includes retaining means for selectively maintaining said member in an expanded condition.

7. The device of claim 6 wherein said retaining means comprises one or more protrusions on a first surface adjacent one of said ends and one or more cavities on a second surface cooperating with said first surface for receiving said protrusions.

8. In a drip coffee maker having a filter basket and a filter having coffee grounds therein, a method of preventing coffee grounds from passing over the edge of the filter comprising contracting an annular member of claim 1, placing said contracted member inside said filter below the edge thereof, and releasing said member from contraction whereby said member expands and urges said filter against said filter basket.

9. The device of claim 1 wherein said annular member includes a pair of tabs secured thereto for being urged together to contract said annular member.

10. The device of claim 9 wherein each of said tabs is adjacent a different one of said opposite ends of said annular member.

* * * * *